(12) United States Patent
Pedemonte (10) Patent No.: US 12,465,030 B2
(45) Date of Patent: Nov. 11, 2025

(54) SPEARGUN FOR UNDERWATER FISHING (71) Applicant: CRESSI-SUB S.P.A., Genoa (IT)

(72) Inventor: Stefano Pedemonte, Genoa (IT)

(73) Assignee: CRESSI-SUB S.P.A., Genoa (IT)

( * ) Notice: Subject to any disclaimer, the term of this patent is extended or adjusted under 35 U.S.C. 154(b) by 44 days.

(21) Appl. No.: 18/093,790

(22) Filed: Jan. 5, 2023

(65) Prior Publication Data

US 2023/0247973 A1     Aug. 10, 2023

(30) Foreign Application Priority Data

Feb. 9, 2022   (IT) ................. 102022000002369

(51) Int. Cl.
A01K 81/06    (2006.01)
F41B 7/04     (2006.01)

(52) U.S. Cl.
CPC ............ A01K 81/06 (2013.01); F41B 7/046 (2013.01)

(58) Field of Classification Search
CPC ......... A01K 81/06; A01K 81/04; F41B 7/046; F41B 7/04; F41B 5/143
See application file for complete search history.

(56) References Cited

U.S. PATENT DOCUMENTS

| | | | | |
|---|---|---|---|---|
| 1,133,189 A * | 3/1915 | Shanon | ...................... | F41B 5/12 124/35.1 |
| 2,715,895 A * | 8/1955 | Loveless | ................... | F41B 3/02 124/20.3 |
| 4,206,740 A * | 6/1980 | Lydon | ....................... | F41B 5/12 124/40 |
| 5,642,723 A * | 7/1997 | Hogan | .................... | F41B 7/003 124/20.3 |
| 10,165,765 B1 * | 1/2019 | Ching | ..................... | F41B 11/83 |
| 2007/0163558 A1 * | 7/2007 | Riffe | ....................... | F41B 3/005 124/22 |
| 2009/0038600 A1 * | 2/2009 | Robinik | ................ | A01K 81/00 124/22 |
| 2019/0323793 A1 * | 10/2019 | Shaulov | .................... | F42B 6/02 |
| 2021/0048268 A1 * | 2/2021 | Trpkovski | ................ | F41B 3/02 |
| 2022/0030848 A1 * | 2/2022 | Watson | ............. | A41D 13/0125 |
| 2022/0065581 A1 * | 3/2022 | Zournatzis | ................ | F41B 7/04 |

FOREIGN PATENT DOCUMENTS

| | | | | |
|---|---|---|---|---|
| EP | 1715284 | * | 10/2006 | ............. A01K 81/04 |
| EP | 2136176 | * | 12/2009 | ................ F41B 7/04 |
| EP | 2136176 A2 | | 12/2009 | |

(Continued)

OTHER PUBLICATIONS

Exended European Search Report issued in European Application No. 22215383.5 dated Jun. 16, 2023.

Primary Examiner — John E Simms, Jr.
(74) Attorney, Agent, or Firm — TROUTMAN PEPPER LOCKE LLP (57) ABSTRACT The speargun for underwater fishing comprises a metal spear provided with one or more engagement heels, a hand grip having a retaining mechanism for retaining the spear and provided with trigger for releasing the spear, a barrel having an upper longitudinal guide that slidingly supports the spear, a terminal head for engaging at least one rubber band for the propulsive thrust of the spear, the head having a front recess where at least one permanent magnet for attracting said spear is positioned.

11 Claims, 6 Drawing Sheets (56) References Cited

FOREIGN PATENT DOCUMENTS

| EP | 2136176 | A3 | 7/2013 | |
|----|---------|----|--------|-|
| FR | 2798188 | A3 | 3/2001 | |
| FR | 2887326 | A1 | 12/2006 | |
| FR | 2960957 | * | 12/2011 | ............... F41B 7/04 |
| FR | 2960957 | A1 | 12/2011 | |
| IT | 20090253 | A1 | 6/2011 | |
| WO | 2006134278 | A1 | 12/2006 | |

* cited by examiner

SPEARGUN FOR UNDERWATER FISHING

CROSS REFERENCE TO RELATED APPLICATIONS

This application claims benefit of priority to Italian Patent Application No. 102022000002369, filed Feb. 9, 2022, the entire contents of which are hereby incorporated by reference.

FIELD

The present invention relates to a speargun for underwater fishing.

BACKGROUND

There is a known type of speargun for underwater fishing comprising a metal spear provided with one or more engagement heels, a hand grip having a mechanism for retaining the spear and provided with a trigger for releasing the spear, a barrel having an upper longitudinal guide that slidingly supports the spear, and a terminal head provided with a plurality of holes where circular rubber bands are engaged.

The circular rubber bands, which are subjected to a tensile force when engaged in the engagement heels of the spear retained by the retaining mechanism, accumulate potential elastic energy which is transferred to the spear, providing it with the necessary propulsive thrust when the trigger is pulled.

To date there are various known systems for retaining the spear in the correct position along the guide, thus preventing it from oscillating uncontrollably due to the movements of the diver while in water and out of water.

A magnetic spear-retaining system comprising a permanent magnet buried in the stock of the speargun is known from US2007/0163558.

Other magnetic spear-retaining systems integrated into the head of the speargun are known.

Such systems include a series of magnets housed in a box positioned in a through opening that extends transversely between the two sides of the head.

This spear-retaining solution requires a great deal of space for positioning the box and thus reduces the availability of space for other components, for example for the holes accommodating the rubber bands, so much so that the heads fitted with this magnetic retaining system typically have one or at most two holes for one or at most two circular rubber bands.

The performances of the speargun, in terms of range, are thus penalized by the construction adopted for the magnetic spear-retaining system.

Moreover, this magnetic spear-retaining system requires the use of a series of additional components, including, for example, the box housing the magnets, and a very invasive intervention of modifying the construction and redesigning the head.

SUMMARY

The technical task of the present invention, therefore, is to provide a speargun for underwater fishing that enables the aforementioned technical drawbacks of the prior art to be eliminated.

Within the scope of this technical task, one object of the invention is to provide a speargun for underwater fishing that has a safe, effective magnetic spear-retaining system.

Another object of the invention is to provide a speargun for underwater fishing which has a space-saving magnetic spear-retaining system.

Another object of the invention is to provide a speargun for underwater fishing which has a magnetic spear-retaining system that is structurally simple and easy to implement.

Another object of the invention is to provide a speargun for underwater fishing that has a magnetic spear-retaining system which allows shooting precision to be improved.

Another object of the invention is to provide a speargun for underwater fishing that has a magnetic spear-retaining system which allows for easier reloading of the spear in the guide provided on the barrel.

Another object of the invention is to provide a speargun for underwater fishing that has a magnetic spear-retaining system which allows the range of the spear to be improved without increasing the overall dimensions of the head of the speargun.

The technical task, as well as these and other objects, are achieved according to the present invention by providing a speargun for underwater fishing comprising a metal spear provided with one or more engagement heels, a hand grip having a retaining mechanism for retaining said spear and provided with trigger for releasing said spear, a barrel having an upper longitudinal guide that slidingly supports said spear, a terminal head for engaging at least one rubber band for the propulsive thrust of the spear, characterised in that said head has a front recess where at least one permanent magnet for attracting said spear is positioned.

In a preferred embodiment of the invention said head has a rear end connecting to said barrel and a front end onto which a front wall of said front recess opens.

In a preferred embodiment of the invention, said permanent magnet is configured for an introduction through said open front wall of said recess.

In a preferred embodiment of the invention, said recess has a blind upper wall, a blind lower wall, a blind rear wall and two opposing blind lateral walls.

Advantageously, said head can be interchangeable.

The speargun according to the invention can employ a terminal head provided with a plurality of holes where circular rubber bands are engaged.

In one embodiment of the invention, said head has a plurality of holes interposed between said rear end of said head and said permanent magnet.

In a preferred embodiment of the invention, said head has three holes interposed between said rear end of said head and said permanent magnet.

In a preferred embodiment of the invention said three holes follow one another in the direction of the longitudinal axis of said speargun.

It is also possible to use a different head that comprises at least one lateral pulley on which the rubber band for the propulsive thrust of the spear is wound, in the case of a speargun known in the jargon as a "roller".

In a preferred embodiment of the invention, said permanent magnet is embedded in a glue.

In a preferred embodiment of the invention, the walls of said recess have reliefs calibrated so as to create a gap between said recess and said permanent magnet occupied by said glue.

In a preferred embodiment of the invention said permanent magnet has a parallelepiped configuration.

BRIEF DESCRIPTION OF THE DRAWINGS

Additional features and advantages of the invention will become more apparent from the description of a preferred but not exclusive embodiment of the speargun for underwater fishing according to the invention, illustrated by way of non-limiting example in the appended drawings, in which.

DETAILED DESCRIPTION

The speargun 1 comprises, in a known manner, a metal spear 2, a hand grip 4 having a retaining mechanism 5 for retaining the metal spear 2 and provided with a trigger 6 for releasing the spear 2, a barrel 7 having an upper longitudinal guide 8 that slidingly supports the metal spear 2, a terminal head 9 for engaging one or more rubber bands 11 for the propulsive thrust of the metal spear 2.

Figure 1:
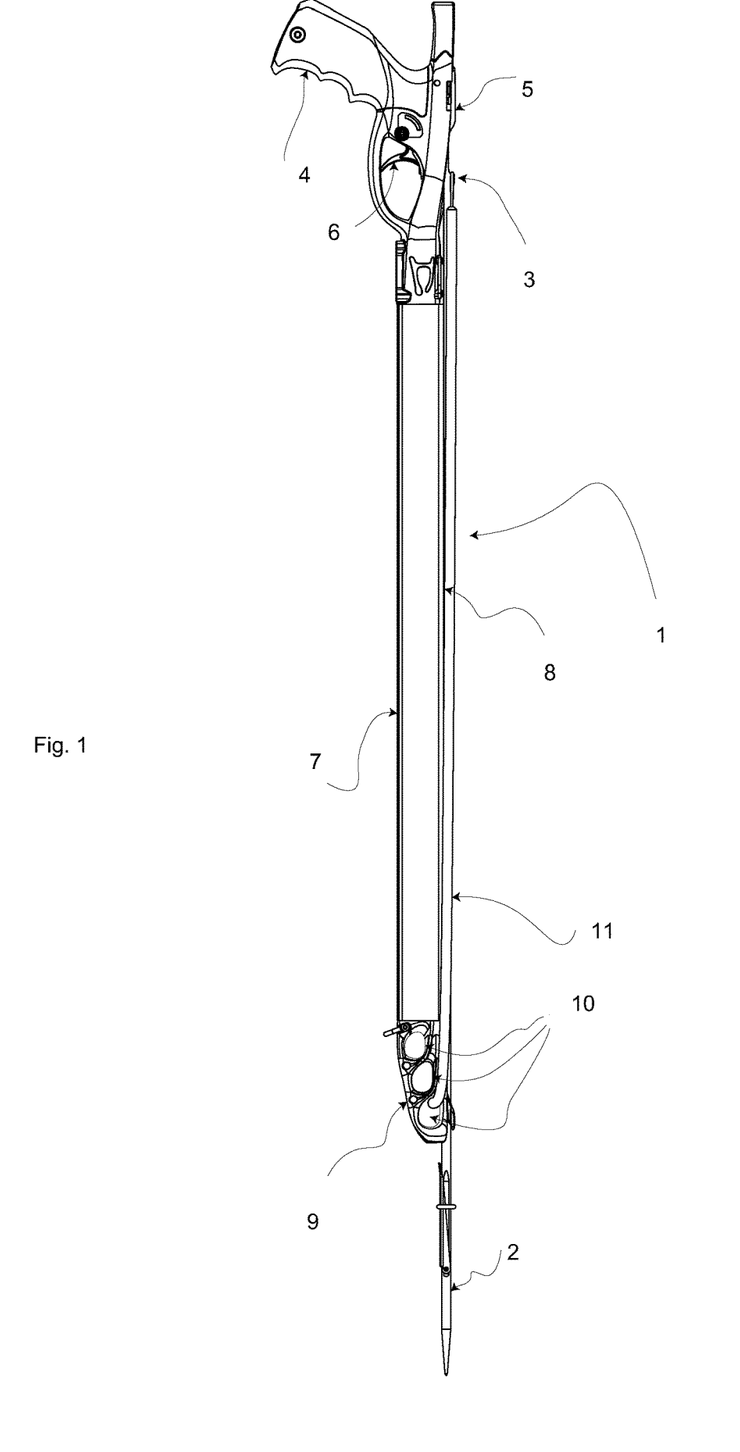
FIG. 1 shows a side elevation view of the speargun.
Figure 2:
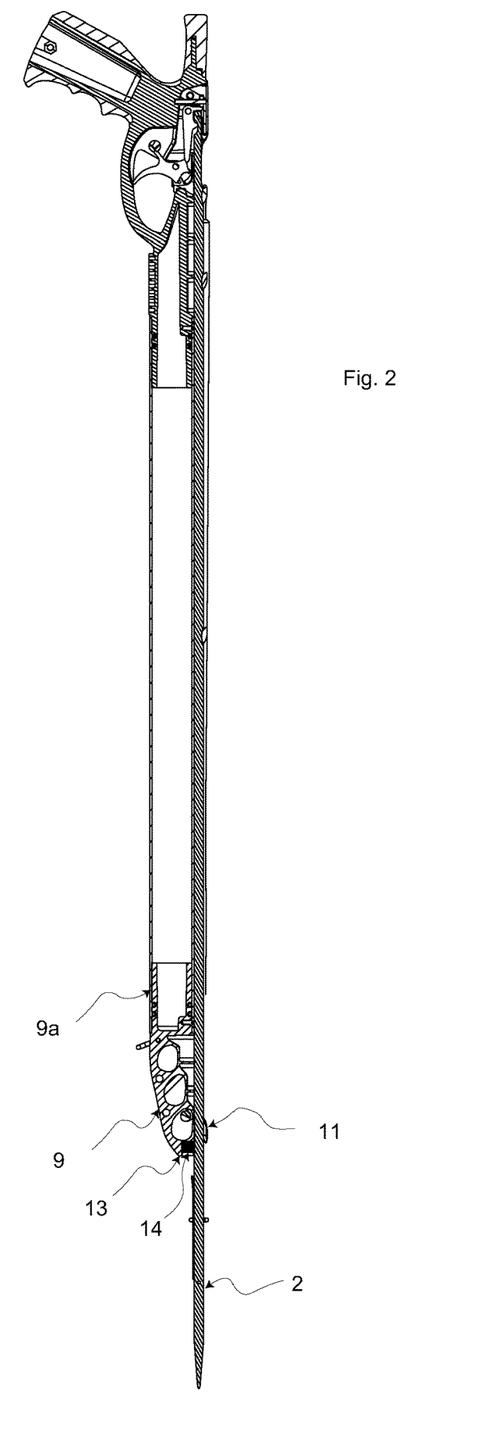
FIG. 2 shows a side elevation view of the speargun sectioned according to a vertical longitudinal plane.
Figure 3:
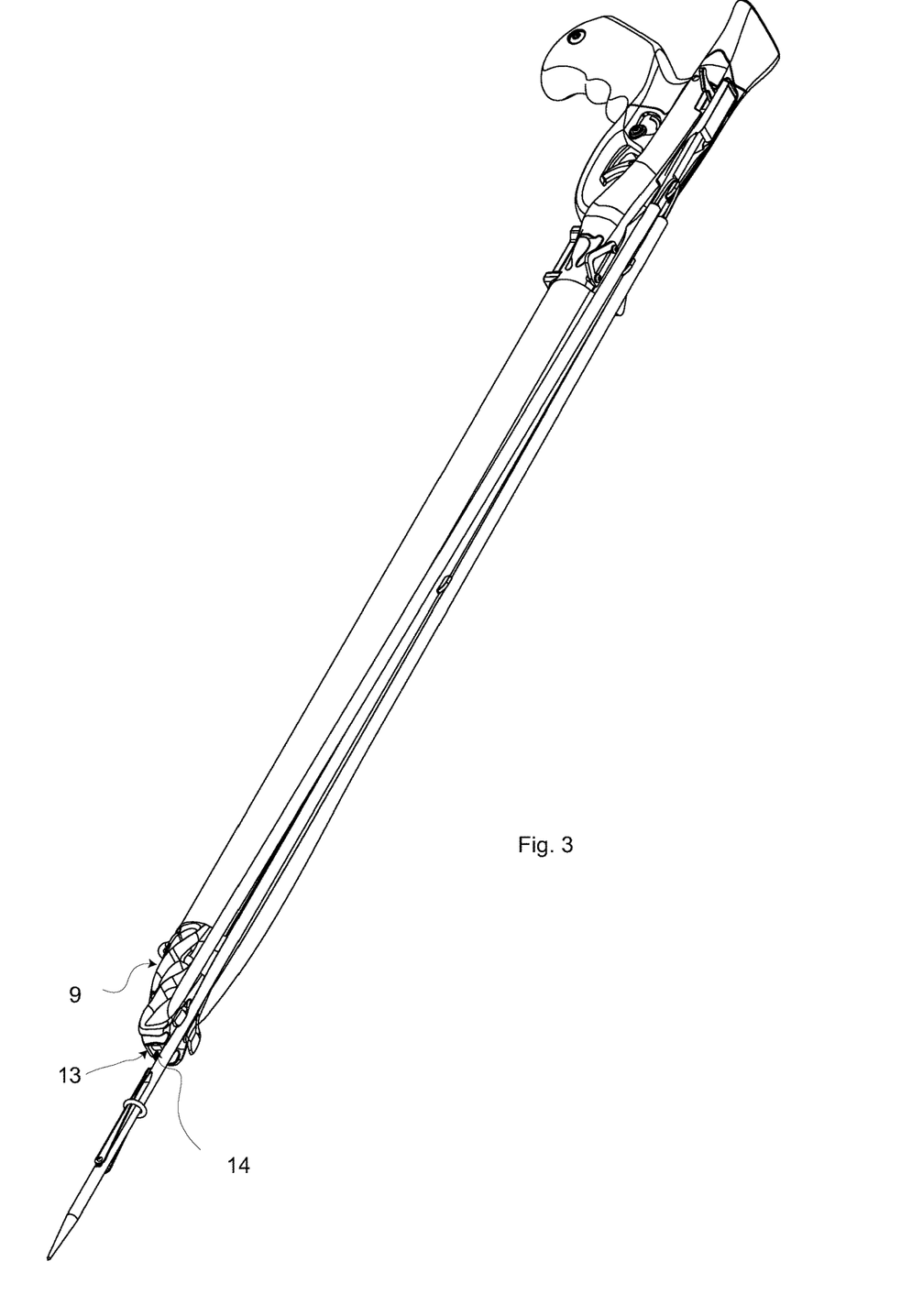
FIG. 3 shows an axonometric view of the speargun.
Figure 4:
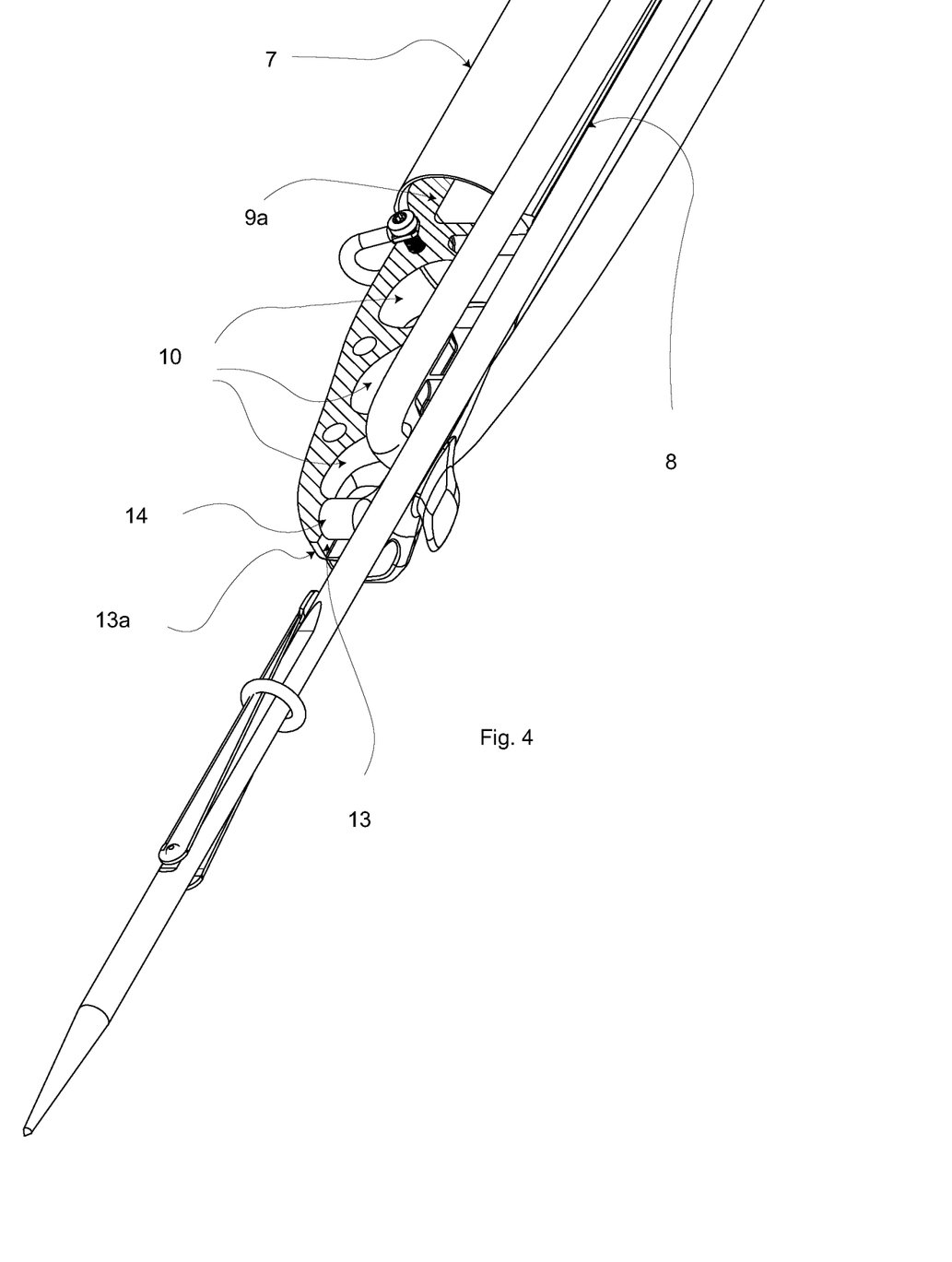
FIG. 4 shows an axonometric view of the front part of the speargun with the head sectioned according to a vertical longitudinal plane.
Figure 5:
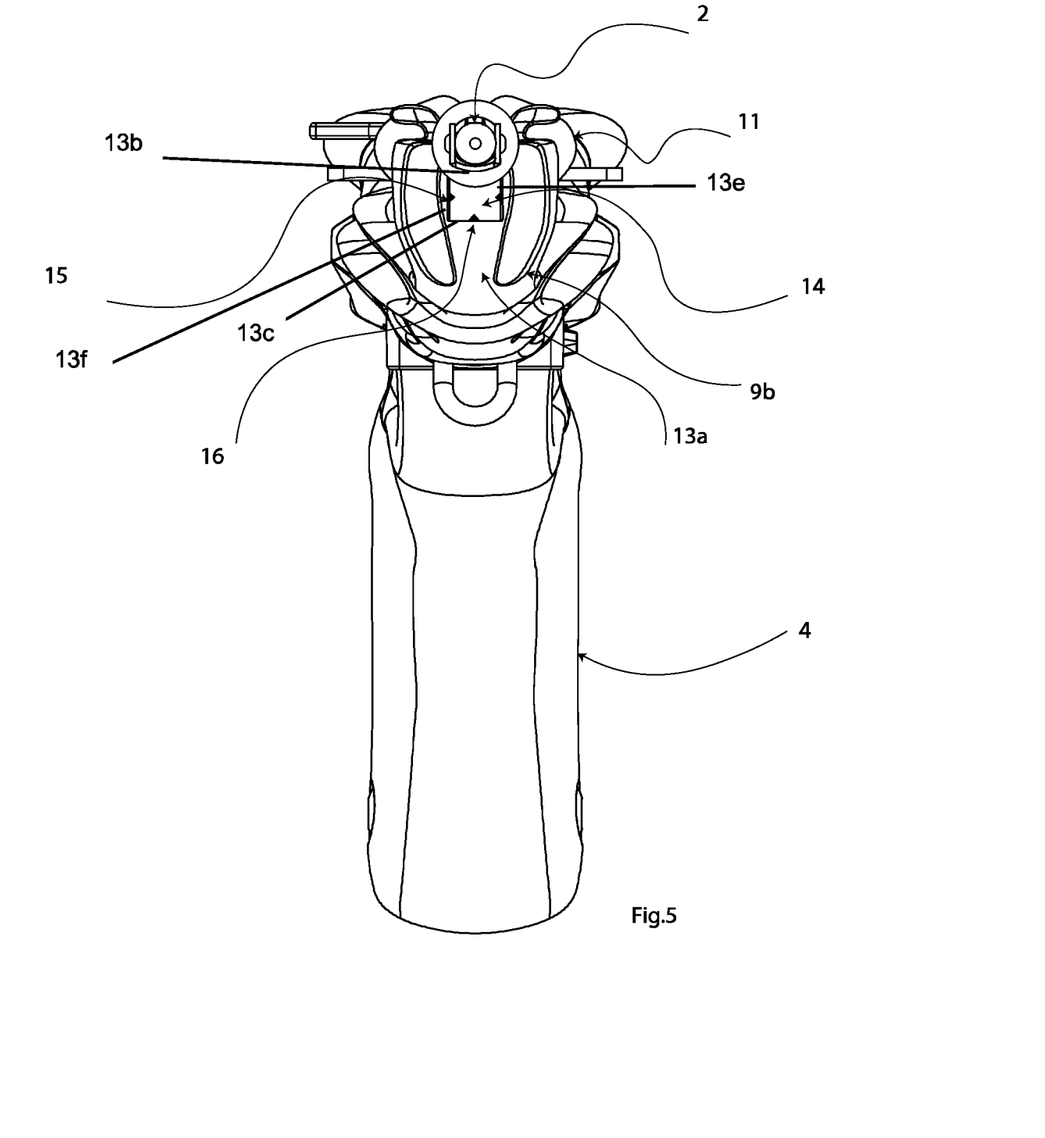
FIG. 5 shows a front view of the speargun.
Figure 6:
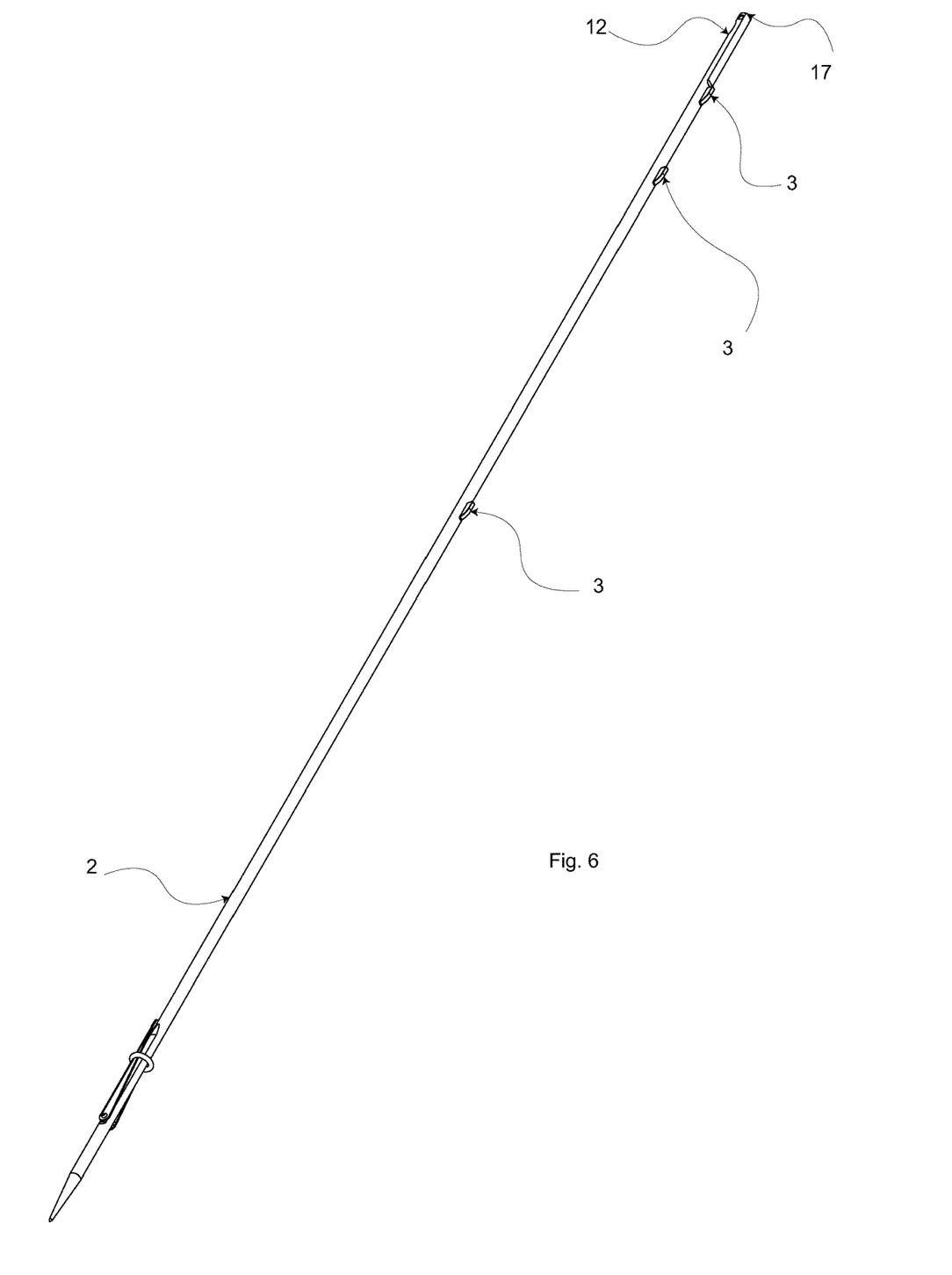
FIG. 6 shows an axonometric view of the spear.

The metal spear 2 has one or more heels 3 at the top for engaging the rubber bands 11 and, in a more rearward position diametrically opposed to the heels 3, a further heel 12 for engaging a hook of the retaining mechanism 5.

The metal spear 2 can also have a rear through hole 17, tied to which there is a line (not shown) that keeps the spear 2 anchored to the speargun 1 after shooting.

The mechanism 5 for retaining the spear 2 is housed in the hand grip 4 and, being of a well-known type, it will not be described in detail.

The rubber bands 11, with reference to the illustrated embodiment, are circular rubber bands that are engaged in holes 10 of the terminal head 9.

The rubber bands 11 are placed under a tensile force when the diver engages them in the engagement heels 3 of the metal spear 2 retained by the retaining mechanism 5 in the launching position in the longitudinal guide 8.

The barrel 7 is generally formed by a tubular element made of metal, for example aluminium or an alloy thereof, at the rear of which the hand grip 4 is fixed and at the front of which the terminal head 9 is fixed.

Advantageously, the terminal head 9 has a front recess 13 where at least one permanent magnet 14 for attracting the metal spear 2 is positioned.

In the preferred solution illustrated, a single permanent magnet 14 is envisaged.

The terminal head 9 has a rear end 9a connecting to the barrel 7 and a front end 9b onto which a front wall 13a of said front recess 13 opens.

The permanent magnet 14 is configured for an introduction through the open front wall 13a of the recess 13.

The recess 13 has a blind upper wall 13b, a blind lower wall 13c, a blind rear wall 13d and two opposing blind lateral walls 13e, 13f.

The holes 10 are interposed between the rear end 9a of the head 9 and the permanent magnet 14.

More precisely, three holes 10 are provided, interposed between the rear end 9a of the head 9 and the permanent magnet 14.

The three holes 10 follow one another in the direction of the longitudinal axis of the speargun 1.

The permanent magnet 14 is embedded in a glue 15.

The walls of the recess 13, particularly the blind upper wall 13b, the blind lower wall 13c, the blind rear wall 13d and the two opposing blind lateral walls 13e, 13f have calibrated reliefs 16 for centring the permanent magnet 14 which create a gap occupied by the glue 15 between the recess 13 and the permanent magnet 14.

The permanent magnet 14 has a parallelepiped configuration.

The permanent magnet 14 performs various functions.

In fact, on the metal spear 2 it generates a force of attraction that retains the metal spear 2 inside the longitudinal guide 8 when the metal spear 2 is engaged by the retaining mechanism 5, cooperates in order to more precisely guide the sliding of the metal spear 2 along the longitudinal guide 8 after shooting so as to improve shooting precision, and cooperates in order to correctly reposition the metal spear 2 in the longitudinal guide 8 after shooting.

Advantageously, given that the recess 13 is located at the front end 9b of the head 9, the permanent magnet 14 can be very easily mounted by inserting it directly from the open wall 13a of the recess 13.

The permanent magnet 14 thus does not require the availability of other space inside the head 9 for the purpose of mounting it.

Accordingly, the ample part of the head 9 remaining behind the recess 13 can be completely destined for the creation of holes 10, which may thus be multiple.

Furthermore, providing for the front recess 13 has an only marginal impact in the redesign both of existing heads without a magnetic spear-retaining system, and of existing heads endowed with a magnetic spear-retaining system.

In practical terms, the implementation of the magnetic retaining system requires solely a simple crafting of the head of the speargun so as to obtain the front recess 13 where the permanent magnet 14 is inserted.

The head 9 can advantageously be interchangeable.

The above-described speargun can be transformed into a so-called "roller" speargun by replacing the above-described head with a head which, in place of holes, supports at least one lateral pulley on which the rubber band for the propulsive thrust of the spear is wound, preferably at least two opposing coaxial lateral pulleys.

In this case as well, the head, in an identical manner to what was illustrated previously, has a front recess where at least one permanent magnet for attracting the spear is positioned and configured for an introduction through an open front wall of the front recess.

The speargun for underwater fishing thus conceived is susceptible of numerous modifications and variants, all falling within the scope of the inventive concept; furthermore, all of the details may be replaced by technically equivalent elements.

The materials used, as well as the dimensions, may in practice be any whatsoever, according to needs and the state of the art.

What is claimed is:

1. A speargun for underwater fishing comprising a metal spear provided with one or more engagement heels, a hand grip having a retaining mechanism retaining said spear—and provided with a trigger—releasing said spear, a barrel formed by a tubular element and having an upper longitudinal guide that slidingly supports said spear, and a terminal head engaging at least one rubber band providing the propulsive thrust of the spear, said terminal head comprising a rear end connecting to said barrel, a front end with a front recess where at least one permanent magnet attracting said spear is positioned, and two lateral guiding projections extending vertically above the terminal head and above opposite longitudinal edges of the upper longitudinal guide, wherein said terminal head comprises a plurality of holes engaging corresponding circular rubber bands providing the propulsive thrust of the spear, said holes being interposed between said rear end of said head and said permanent magnet, wherein each lateral guiding projection is substantially L-shaped, having a vertical leg extending upwardly above the spear's topmost surface when positioned in the speargun, and a horizontal leg extending outwardly away from a central longitudinal axis of the speargun;

wherein each lateral guiding projection is aligned along an axial extension of a corresponding edge of the opposite longitudinal edges of the upper longitudinal guide;

wherein each lateral guiding projection is closest to the front end than the rear end of the terminal head; and wherein each lateral guiding projection is in a backward position than the permanent magnet.

2. The speargun according to claim 1, wherein said permanent magnet is configured to introduce through an open front wall of said recess.

3. The speargun according to claim 1, wherein said recess comprises a blind upper wall, a blind lower wall, a blind rear wall and two opposing blind lateral walls.

4. The speargun according to claim 1, wherein said head is interchangeable.

5. The speargun according to claim 1, wherein said head comprises three holes interposed between said rear end of said head and said permanent magnet.

6. The speargun according to claim 5, wherein said three holes follow one another in the direction of the longitudinal axis of said speargun.

7. The speargun according to claim 1, wherein said head supports at least one lateral pulley on which said rubber band providing the propulsive thrust of the spear is wound.

8. The speargun according to claim 1, wherein said permanent magnet is embedded in a glue.

9. The speargun according to claim 8, wherein the recess comprises walls, wherein said walls further comprise reliefs calibrated so as to create a gap between said recess and said permanent magnet occupied by said glue.

10. The speargun according to claim 1, wherein said permanent magnet has a parallelepiped configuration.

11. The speargun according to claim 1, wherein said permanent magnet is accessible from the front of the front end of the barrel.

* * * * *